(12) United States Patent  (10) Patent No.: US 8,774,053 B2
Pan et al.  (45) Date of Patent: Jul. 8, 2014

(54) METHOD, NETWORK ELEMENT DEVICE, AND NETWORK SYSTEM FOR ASSOCIATING A TERMINAL DEVICE WITH A NETWORK

(71) Applicant: Huawei Technologies Co., Ltd., Guangdong (CN)

(72) Inventors: Lujia Pan, Shenshen (CN); Cheng He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 140 days.

(21) Appl. No.: 13/629,200

(22) Filed: Sep. 27, 2012

(65) Prior Publication Data

US 2013/0021946 A1  Jan. 24, 2013

Related U.S. Application Data

(63) Continuation of application No. PCT/CN2010/080375, filed on Dec. 28, 2010.

(30) Foreign Application Priority Data

Mar. 31, 2010 (CN) .......................... 2010 1 0137704

(51) Int. Cl.
   *H04L 12/28* (2006.01)
(52) U.S. Cl.
   USPC ......................................................... 370/254
(58) Field of Classification Search
   None
   See application file for complete search history.

(56) References Cited

U.S. PATENT DOCUMENTS

| 7,774,008 | B2 * | 8/2010 | Benaouda et al. | 455/466 |
| 7,969,978 | B2 * | 6/2011 | Napierala | 370/389 |
| 2005/0030945 | A1 * | 2/2005 | Sarikaya et al. | 370/389 |
| 2007/0076681 | A1 * | 4/2007 | Hong et al. | 370/349 |
| 2008/0056261 | A1 * | 3/2008 | Osborn et al. | 370/392 |

(Continued)

FOREIGN PATENT DOCUMENTS

| CN | 1960565 A | 5/2007 |
| CN | 101005418 A | 7/2007 |

(Continued)

OTHER PUBLICATIONS

1st Office Action in corresponding Chinese Patent Application No. 201010137704.5 (Mar. 7, 2013).

(Continued)

*Primary Examiner* — Otis L Thompson, Jr.
(74) *Attorney, Agent, or Firm* — Leydig, Voit & Mayer, Ltd.

(57) ABSTRACT

Embodiments of the present invention provide a method, network element device, and network system for associating a terminal device with a network. The method for associating a terminal device with a network includes: receiving an Association Request message sent by a terminal device, where the Association Request message includes information of a request for associating the terminal device with a sensor network and an IP identifier; processing, according to the Association Request message, the request for associating the terminal device with a sensor network; when it is determined, according to the IP identifier, that the terminal device requests association with an IP network, sending an IP network Association Request message to an Edge Router; receiving a result of processing, by the Edge Router, the request for associating the terminal device with the IP network; sending an Association Respond message to the terminal device.

10 Claims, 9 Drawing Sheets

(56) References Cited

U.S. PATENT DOCUMENTS

| | | | |
|---|---|---|---|
| 2008/0068156 A1* | 3/2008 | Shimokawa et al. | 340/539.22 |
| 2008/0153521 A1* | 6/2008 | Benaouda et al. | 455/466 |
| 2009/0141741 A1* | 6/2009 | Kim et al. | 370/474 |
| 2009/0316701 A1 | 12/2009 | Yoo et al. | |
| 2010/0082789 A1* | 4/2010 | Kim et al. | 709/223 |
| 2010/0177674 A1* | 7/2010 | Aggarwal | 370/312 |
| 2010/0332605 A1* | 12/2010 | Hutchison et al. | 709/206 |
| 2011/0149932 A1* | 6/2011 | Kim et al. | 370/338 |
| 2011/0252235 A1* | 10/2011 | Dolan et al. | 713/168 |
| 2011/0268009 A1* | 11/2011 | Yamada | 370/312 |
| 2011/0268047 A1* | 11/2011 | Nath et al. | 370/329 |
| 2011/0317673 A1* | 12/2011 | Shelby | 370/338 |
| 2012/0057503 A1* | 3/2012 | Ding et al. | 370/254 |
| 2012/0063385 A1* | 3/2012 | Yang et al. | 370/315 |
| 2012/0084568 A1* | 4/2012 | Sarikaya et al. | 713/176 |
| 2012/0265983 A1* | 10/2012 | Yegin et al. | 713/155 |
| 2012/0266223 A1* | 10/2012 | Yegin et al. | 726/7 |
| 2013/0128887 A1* | 5/2013 | Shah | 370/390 |

FOREIGN PATENT DOCUMENTS

| | | | |
|---|---|---|---|
| CN | 101009609 A | 8/2007 | |
| CN | 101047950 A | 10/2007 | |
| CN | 101626629 A | 1/2010 | |

OTHER PUBLICATIONS

International Search Report in corresponding International Patent Application No. PCT/CN2010/080375 (Apr. 7, 2011).

Written Opinion of the International Searching Authority in corresponding International Patent Application No. PCT/CN2010/080375 (Apr. 7, 2011).

"IEEE Standard for Information Technology—Telecommunications and Information Exchange Between Systems—Local and Metropolitan Area Networks—Specific Requirement; Part 15.4: Wireless Medium Access Control (MAC) and Physical Layer (PHY) Specifications for Low-Rate Wireless Personal Area Networks (WPANs)," IEEE Standard, Sep. 2006, IEEE, New York, New York.

Shelby et al., "6LoWPAN Neighbor Discovery; draft-ietf-6lowpan-nd-07," Standards Track, Oct. 26, 2009, The Internet Engineering Task Force, Fremont, California.

\* cited by examiner

METHOD, NETWORK ELEMENT DEVICE, AND NETWORK SYSTEM FOR ASSOCIATING A TERMINAL DEVICE WITH A NETWORK

CROSS-REFERENCE TO RELATED APPLICATIONS

This application is a continuation of International Patent Application No. PCT/CN2010/080375, filed on Dec. 28, 2010, which claims priority to Chinese Patent Application No. 201010137704.5, filed on Mar. 31, 2010, both of which are hereby incorporated by reference in their entireties.

FIELD OF THE INVENTION

The present invention relates to a communications technology field, and in particular, to a method, network element device, and network system for associating a terminal device with a network.

BACKGROUND OF THE INVENTION

During the development of communication networks, besides various IT terminal devices (such as mobile phones, PDAs, and laptops), more and more non-IT terminal devices are integrated with intelligent functions such as audio communication, so that non-IT terminal devices can interact with other devices over communication networks to achieve data communication from machine to machine (M2M).

Terminal devices need to be associated with a sensor network and an IP network before accessing the IP network. The association process includes: a terminal device sends an Association Request message to a Coordinator (Coordinator) or a Personal Area Network Coordinator (PAN Coordinator). The Coordinator or the PAN Coordinator performs processing such as authentication on the terminal device and sends back an Association Respond message to the terminal device to complete associating the terminal device with the sensor network. After being successfully associated with the sensor network, the terminal device can communicate with other devices on the sensor network. To enable the terminal device to access an IP network, the terminal device broadcasts a Router Solicitation message and receives a Router Advertisement message sent by a router (the router records the network association message of the terminal device). The Router Advertisement message carries a prefix of the IP network to which the terminal device belongs. Then, the terminal device sends a Node Registration message that carries the IP network prefix. If the terminal device directly accesses the Edge Router on a local sensor network, the terminal device sends a Node Registration message to the Edge Router. Otherwise, the terminal device sends a Node Registration message to the router to which the terminal device accesses and the router forwards the Node Registration message to the Edge Router. The Edge Router allocates an IP address for the terminal device according to the IP network prefix and sends back a Node Confirmation message that carries the IP address allocated for the terminal device. With the Node Confirmation message being sent, the terminal device successfully associates with the IP network.

During a research in the conventional art, the inventor finds at least the following problems: in the conventional art, associating a terminal device with a sensor network is separated from that with an IP network. The entire association process needs multiple signaling interworking, which wastes network resources and does not comply with the principle of low power-consumption.

SUMMARY OF THE INVENTION

Embodiments of the present invention provide a method, network element device, and network system for associating a terminal device with a network. The present invention can simplify signal interworking when a terminal device is associated with a sensor network and an IP network, and therefore save network resources.

An embodiment of the present invention provides:

A method for associating a terminal device with a network, including:

receiving an Association Request message sent by a terminal device, where the Association Request message includes information of a request for associating the terminal device with a sensor network and an IP identifier, where the IP identifier indicates whether the terminal device requests association with the IP network;

processing, according to the Association Request message, the request for associating the terminal device with the sensor network;

when it is determined, according to the IP identifier that the terminal device requests association with an IP network, sending an IP network Association Request message to an Edge Router, where the IP network Association Request message is used to indicate that the terminal device requests association with the IP network;

receiving a result of processing, by the Edge Router, the request for associating the terminal device with the IP network sending an Association Respond message to the terminal device, where the Association Respond message includes the result of processing the request for associating the terminal device with the sensor network and the result of processing, by the Edge Router, the request for associating the terminal device with the IP network.

A method for associating a terminal device with a network, including:

receiving an Association Request message sent by a terminal device, where the Association Request message includes information of a request for associating the terminal device with a sensor network and an IP identifier, where the IP identifier indicates whether the terminal device requests association with the IP network;

processing, according to the Association Request message, the request for associating the terminal device with the sensor network;

when it is determined, according to the IP identifier, that the terminal device requests association with an IP network, forwarding the Association Request message to an M2M Coordinator to trigger the M2M Coordinator to send an IP network Association Request message to an Edge Router, where the IP network Association Request message is used to indicate that the terminal device requests association with the IP network;

receiving a result of processing, by the Edge Router, the request for associating the terminal device with the IP network forwarded by the M2M Coordinator;

sending an Association Respond message to the terminal device, where the Association Respond message includes the result of processing the request for associating the terminal device with the sensor network and the result of processing, by the Edge Router, the request for associating the terminal device with the IP network.

A method for associating a terminal device with a network, including:

sending an Association Request message, where the Association Request message includes information of a request for associating the terminal device with a sensor network and an IP identifier, where the IP identifier indicates whether the terminal device requests association with the IP network;

receiving an Association Respond message, where the Association Respond message includes: the result of processing a request for associating the terminal device with the sensor network; when the IP identifier indicates that the terminal device requests association with an IP network, the Association Respond message further includes the result of processing a request for associating the terminal device with the IP network.

An M2M Coordinator, including:

the first receiving unit, configured to receive an Association Request message sent by a terminal device, where the Association Request message includes information of a request for associating the terminal device with a sensor network and an IP identifier, where the IP identifier indicates whether the terminal device requests association with an IP network;

the first sensor network processing unit, configured to process, according to the Association Request message, the request for associating a terminal device with a sensor network;

the first determining unit, configured to determine, according to the IP identifier, whether the terminal device requests association with an IP network;

the second sending unit, configured to, when the terminal device requests association with an IP network, send an IP network Association Request message to an Edge Router, where the IP network Association Request message is used to indicate that the terminal device requests association with the IP network;

the second receiving unit, configured to receive a result of processing, by an Edge Router, the request for associating the terminal device with the IP network;

the first sending unit, configured to send an Association Respond message to the terminal device, where the Association Respond message includes the result of processing the request for associating the terminal device with the sensor network and the result of processing, by the Edge Router, the request for associating the terminal device with the IP network.

A Coordinator, including:

the third receiving unit, configured to receive an Association Request message sent by a terminal device, where the Association Request message includes information of a request for associating the terminal device with a sensor network and an IP identifier, where the IP identifier indicates whether the terminal device requests association with an IP network;

the second sensor network processing unit, configured to process, according to the Association Request message, the request for associating the terminal device with a sensor network;

the second determining unit, configured to determine, according to the IP identifier whether the terminal device requests association with an IP network;

the fourth sending unit, configured to, when the terminal device requests association with an IP network, forward an Association Request message to an M2M Coordinator to trigger the M2M Coordinator to send an IP network Association Request message to an Edge Router, where the IP network Association Request message is used to indicate that the terminal device requests association with the IP network;

the fourth receiving unit, configured to receive a result of processing, by the Edge Router, the request for associating the terminal device with the IP network;

the third sending unit, configured to send an Association Respond message to the terminal device, where the Association Respond message includes the result of processing the request for associating the terminal device with the sensor network and the result of processing, by the Edge Router, the request for associating the terminal device with the IP network.

A terminal device that includes (1) a sending unit configured to send an Association Request message, where the Association Request message includes information of a request for associating the terminal device with a sensor network and an IP identifier, where the IP identifier indicates whether the terminal device requests association with the IP network; (2) a receiving unit configured to receive an Association Respond message, where the Association Respond message includes the result of processing a request for associating the terminal device with the sensor network and, when the IP identifier indicates that the terminal device requests association with an IP network, the Association Respond message further includes the result of processing a request for associating the terminal device with the IP network.

A network system, including an M2M Coordinator and an Edge Router, wherein the M2M Coordinator is configured to receive an Association Request message sent by a terminal device, where the Association Request message includes information of a request for associating the terminal device with a sensor network and an IP identifier, where the IP identifier indicates whether the terminal device requests association with the IP network; process, according to the Association Request message, the request for associating the terminal device with the sensor network; when it is determined, according to the IP identifier, that the terminal device requests association with an IP network, send an IP network Association Request message to an Edge Router, where the IP network Association Request message is used to indicate that the terminal device requests association with the IP network; receive a result of processing, by the Edge Router, the request for associating the terminal device with the IP network; send an Association Respond message to the terminal device, where the Association Respond message includes the result of processing the request for associating the terminal device with the sensor network and the result of processing, by the Edge Router, the request for associating the terminal device with the IP network; the Edge Router is configured to receive an IP network Association Request message and send the result of processing the request for associating the terminal device with the IP network to an M2M Coordinator.

A network system, including a Coordinator, an M2M Coordinator, and an Edge Router, wherein the Coordinator is configured to receive an Association Request message sent by a terminal device, where the Association Request message includes information of a request for associating the terminal device with a sensor network and an IP identifier, wherein the IP identifier indicates whether the terminal device requests association with an IP network; process, according to the Association Request message, the request for associating the terminal device with the sensor network; when it is determined, according to the IP identifier, that the terminal device requests association with an IP network, forward an Association Request message to an M2M Coordinator to trigger the M2M Coordinator to send an IP network Association Request message to an Edge Router, where the IP network Association Request message is used to indicate that the terminal device requests association with the IP network; receive a result of processing, by the Edge Router, the request for associating the terminal device with the IP network forwarded by the M2M; send an Association Respond message to the terminal device, where the Association Respond message includes the result of processing the request for associating the terminal device with the sensor network and the result of processing, by the Edge Router, the request for associating the terminal device with the IP network; the M2M Coordinator is configured to receive an Association Request message and send an IP network Association Request message to an Edge Router; send the result of processing, by the Edge Router, the request for associating the terminal device with the IP network to the Coordinator; the Edge Router is configured to receive an IP network Association Request message and send the result of processing the request for associating the terminal device with the IP network to the M2M Coordinator.

An Association Request message sent by a terminal device in embodiments of the present invention includes a request for associating the terminal device to a sensor network and an IP identifier. The IP identifier indicates whether the terminal device requests association with an IP network. A Coordinator or an M2M Coordinator processes, according to the Association Request message, the request for associating the terminal device with the sensor network; when the terminal device requests association with an IP network, the Coordinator or the M2M Coordinator sends an IP network Association Request message to an Edge Router to trigger the Edge Router to process the request for associating the terminal device with the IP network; the Coordinator or the M2M Coordinator sends the result of processing the request for associating the terminal device with the sensor network and the result of processing, by the Edge Router, the request for associating the terminal device with the IP network to the terminal device. In this way, the signaling interworking process when the terminal device is associated with the sensor network and IP network is simplified, which saves network resources and complies with the principle of lower power consumption.

BRIEF DESCRIPTION OF THE DRAWINGS

To illustrate the technical solution of the present invention more clearly, the drawings that need to be used in the present invention are presented in embodiments of the present invention. It is obvious that the drawings merely provide several applications of the present invention. Those skilled in the art may obtain other drawings based on these drawings without innovative work.

DETAILED DESCRIPTION OF THE EMBODIMENTS

Figure 1:
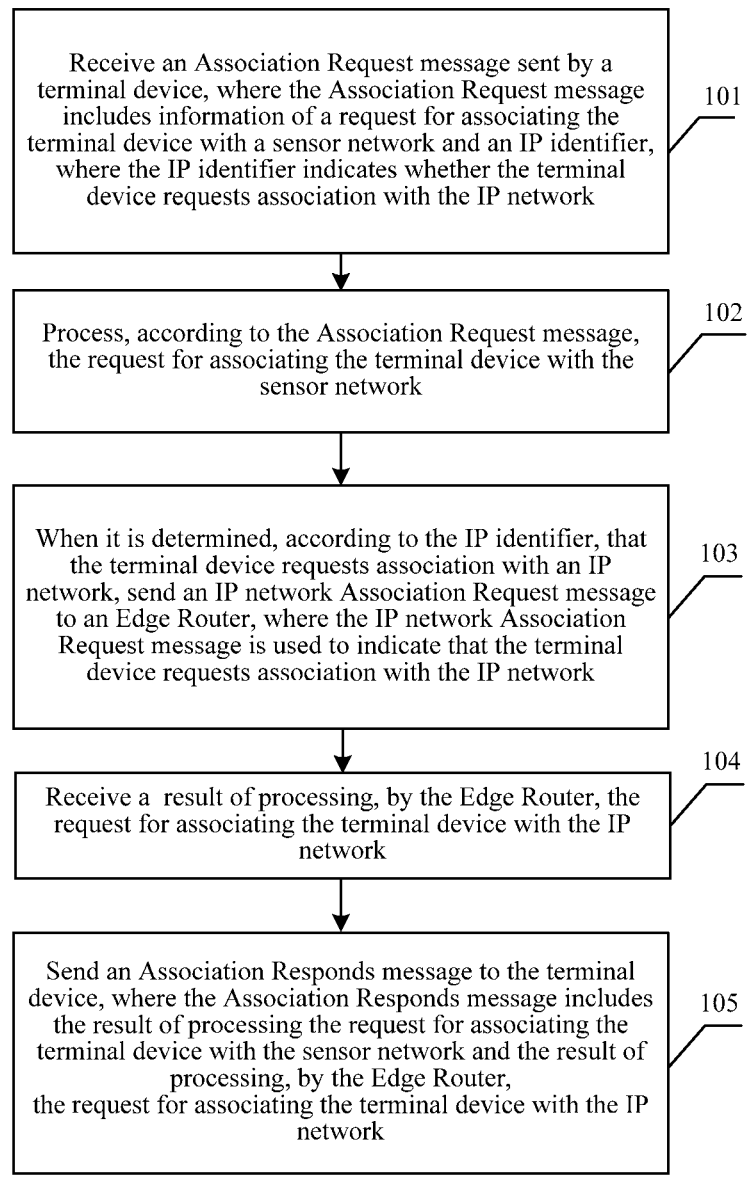
FIG. 1 is a flowchart of a method for associating a terminal device with a network provided in an embodiment of the present invention.
Figure 2:
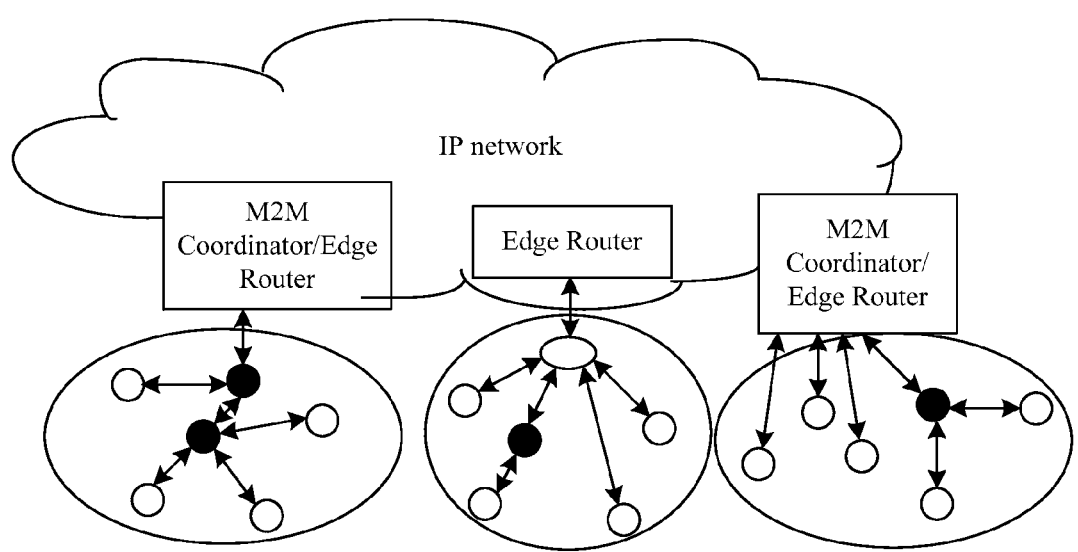
FIG. 2 is a diagram of a method for associating a terminal device with a network provided in an embodiment of the present invention.

As shown in FIG. 1 and FIG. 2, embodiments of the present invention provide a method for associating a terminal device with a network. In FIG. 2, a solid circle indicates a Coordinator, a hollow circle indicates a terminal device, and an ellipse indicates an M2M Coordinator that is independent from an Edge Router. The method includes:

101: Receive an Association Request message sent by a terminal device, where the Association Request message includes information of a request for associating the terminal device with a sensor network and an IP identifier, where the IP identifier indicates whether the terminal device requests association with the IP network;

wherein, the execution body of each step in this embodiment may be an M2M Coordinator. If a terminal device is connected to the M2M Coordinator through a Coordinator, the Association Request message is forwarded by the Coordinator to the M2M Coordinator after the Coordinator determines, according to an IP identifier, that the terminal device requests association with an IP network; if the terminal device is directly connected to the M2M Coordinator, the Association Request message is directly sent by the terminal device to the M2M Coordinator.

102: Process, according to the Association Request message, the request for associating the terminal device with the sensor network.

The processing the request for associating the terminal device with the sensor network includes: the M2M Coordinator authenticates the terminal device; optionally, the M2M Coordinator may also allocate a short address to the terminal device for accessing the sensor network. If the M2M Coordinator does not allocate a short address to the terminal device, the terminal device may use a 64-bit extension address to access the sensor network.

The result of processing the request for associating the terminal device with the sensor network includes: a result of authenticating the terminal device by the M2M Coordinator, or a short address allocated by the M2M Coordinator to the terminal device.

103: When it is determined, according to the IP identifier, that the terminal device requests association with an IP network, send an IP network Association Request message to an Edge Router, where the IP network Association Request message is used to indicate that the terminal device requests association with the IP network.

In certain embodiments, an M2M Coordinator and an Edge Coordinator may locate on the same physical entity or locate on independent entities (as shown in FIG. 2, the ellipse indicates an M2M Coordinator that is independent from an Edge Router), which does not affect the implementation of the present invention.

It should be noted that M2M Coordinators in each embodiment of the present invention refer to Edge Coordinators on a sensor network and Coordinators refer to non-Edge Coordinators on the sensor network.

104: Receive a result of processing, by the Edge Router, the request for associating the terminal device with the IP network.

The processing result provided by the Edge Router of processing the request for associating the terminal device with the IP network includes: an IP address allocated by the Edge Router for the terminal device.

105: Send an Association Respond message to the terminal device, where the Association Respond message includes the result of processing an Association Request for associating the terminal device with the sensor network and the result of processing, by the Edge Router, an Association Request for associating the terminal device with the IP network.

An Association Request message sent by a terminal device in embodiments of the present invention includes a request for associating the terminal device to a sensor network and an IP identifier. The IP identifier indicates whether the terminal device requests association with an IP network. An M2M Coordinator processes, according to the Association Request message, the request for associating the terminal device with the sensor network; when the terminal device requests are associated with an IP network, the M2M Coordinator sends an IP network Association Request message to an Edge Router to trigger the Edge Router to process the request for associating the terminal device with the IP network; the M2M Coordinator sends to the terminal device the result of processing the request for associating the terminal device with the sensor network and the result of processing, by the Edge Router, the request for associating the terminal device with the IP network. In this way, the signaling interworking process when the terminal device is associated with the sensor network and IP network is simplified, which saves network resources and complies with principle of lower power consumption.

Figure 3:
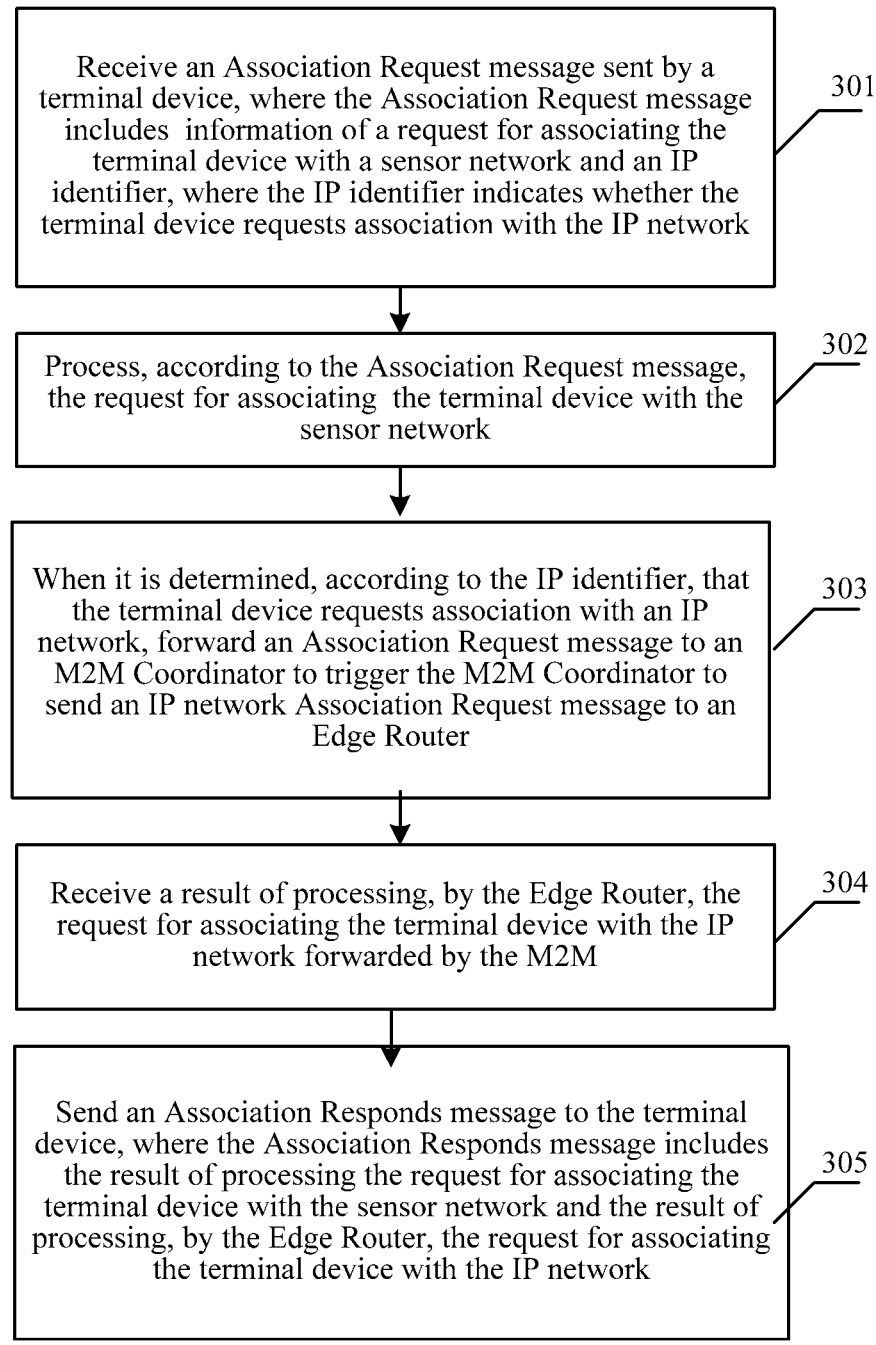
FIG. 3 is a flowchart of a method for associating a terminal device with a network provided in another embodiment of the present invention.

As shown in FIG. 2 and FIG. 3, another embodiment of the present invention provides a method for associating a terminal device with a network, including:

301: Receive an Association Request message sent by a terminal device, where the Association Request message includes information of a request for associating the terminal device with a sensor network and an IP identifier, where the IP identifier indicates whether the terminal device requests association with the IP network.

The execution body of each step in this embodiment may be a Coordinator.

302: Process, according to the Association Request message, the request for associating the terminal device with the sensor network.

The processing the request for associating the terminal device with the sensor network includes: the Coordinator authenticates the terminal device; optionally, the Coordinator may also allocate a short address for the terminal device for accessing the sensor network.

If the Coordinator does not allocate a short address to the terminal device, the terminal device uses a 64-bit extension address to access the sensor network.

The result of processing the request for associating the terminal device with the sensor network includes: a result of authenticating the terminal device by the M2M Coordinator, or a short address allocated by the Coordinator for the terminal device.

303: When it is determined, according to the IP identifier, that the terminal device requests association with an IP network, forward an Association Request message to an M2M Coordinator to trigger the M2M Coordinator to send an IP network Association Request message to an Edge Router, where the IP network Association Request message is used to indicate that the terminal device requests association with the IP network.

304: Receive a result of processing, by the Edge Router, the request for associating the terminal device with the IP network forwarded by the M2M Coordinator.

The result of processing, by the Edge Router, the request for associating the terminal device with the IP network includes: an IP address allocated by the Edge Router for the terminal device.

In certain embodiments, an M2M Coordinator and an Edge Coordinator may locate on the same physical entity or locate on independent entities (as shown in FIG. 2, the ellipse indicates an M2M Coordinator that is independent from an Edge Router), which does not affect the implementation of the present invention.

305: Send an Association Respond message to the terminal device, where the Association Respond message includes the result of processing the Association Request for associating the terminal device with the sensor network and the result of processing, by the Edge Router, the Association Request for associating the terminal device with the IP network.

An Association Request message sent by a terminal device in embodiments of the present invention includes a request for associating the terminal device with a sensor network and an IP identifier. The IP identifier indicates whether the terminal device requests association with an IP network. A Coordinator processes, according to the Association Request message, the request for associating the terminal device with the sensor network; upon identifying that the terminal device requests for associating with an IP network based on an IP identifier, the Coordinator forwards an Association Request message to an M2M Coordinator to trigger the M2M Coordinator to send an IP network Association Request message to an Edge Router; the Coordinator sends the result of processing, by the Coordinator, the Association Request for associating the terminal device with the sensor network and the result of processing, by the Edge Router, the Association Request for associating the terminal device with the IP network forwarded by the M2M Coordinator. In this way, the signaling interworking process when the terminal device associates with the sensor network and IP network is simplified, which saves network resources and complies with the principle of lower power consumption.

Figure 4:
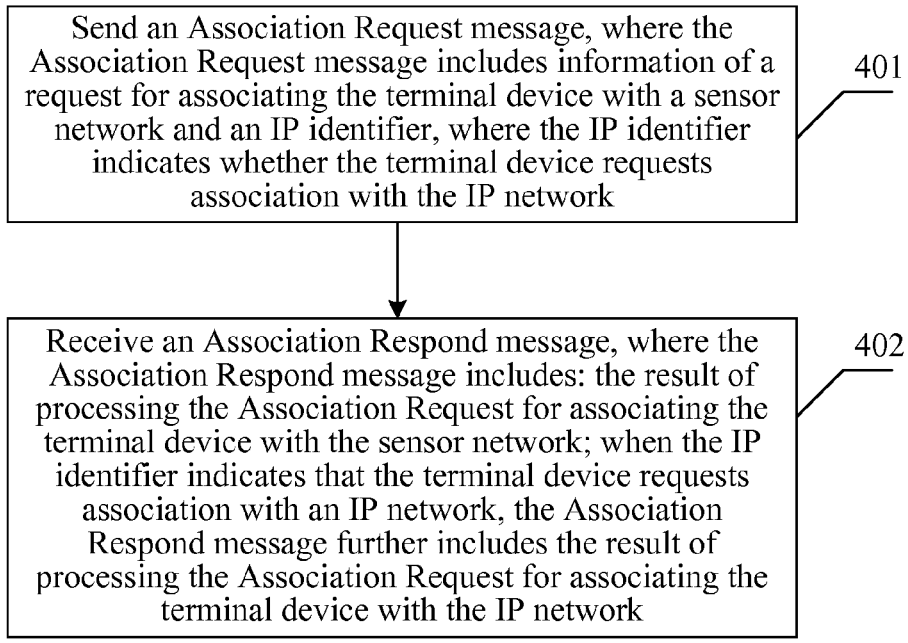
FIG. 4 is a flowchart of a method for associating a terminal device with a network provided in still another embodiment of the present invention.

As shown in FIG. 4, another embodiment of the present invention provides a method for associating a terminal device with a network, including:

401: Send an Association Request message, where the Association Request message includes information of a request for associating the terminal device with a sensor network and an IP identifier, where the IP identifier indicates whether the terminal device requests association with the IP network;

The execution body of each step in this embodiment is a terminal device.

In certain embodiments, if the terminal device may be directly connected to the M2M Coordinator, the terminal device directly sends an Association Request message to the M2M Coordinator; in certain embodiments, if a terminal device is connected to the M2M Coordinator through a Coordinator, the Association Request message is forwarded by the Coordinator to the M2M Coordinator.

402: Receive an Association Respond message, where the Association Respond message includes: the result of processing the Association Request for associating the terminal device with the sensor network; when the IP identifier indicates that the terminal device requests association with an IP network, the Association Respond message further includes the result of processing the Association Request for associating the terminal device with the IP network.

The result of processing the request for associating the terminal device with the sensor network refers to the result of processing, by the M2M Coordinator or Coordinator, the request for associating the terminal device to the sensor network; the result of processing the request for associating the terminal device with the IP network refers to the result of processing, by the Edge Router, the request for associating the terminal device with the IP network.

If the terminal device is directly connected to the M2M Coordinator, the M2M Coordinator processes the request for associating the terminal device with the sensor network and sends an Association Respond message to the terminal device. If the terminal device is connected to the M2M Coordinator through a Coordinator, the M2M Coordinator processes the request for associating the terminal device with the sensor network, or the Coordinator processes the request for associating the terminal device with the sensor network. Whether the M2M Coordinator or the Coordinator processes the request for associating the terminal device with the sensor network is determined by a network rule. If the rule specifies that the M2M Coordinator processes the request for associating the terminal device with the sensor network, the Coordinator only needs to forward an Association Request message to the M2M Coordinator after determining, according to an IP identifier, that the terminal device requests association with an IP network. If the rule specifies that the Coordinator processes the request for associating the terminal device with the sensor network, the Coordinator needs to forward an Association Request message to the M2M Coordinator after determining, according to an IP identifier, that the terminal device requests for association with an IP network, and meanwhile the Coordinator needs to process the request for associating the terminal device with the sensor network. After receiving the Association Request message, the M2M Coordinator does not process the request for associating the terminal device with the sensor network when learning that the Association Request is forwarded by the Coordinator.

In embodiments of the present invention, an Association Request message directly sent by a terminal device includes information of a request for associating the terminal device with a sensor network and an IP identifier. The IP identifier indicates whether the terminal device requests association with the IP network. The Association Request message can trigger a Coordinator or an M2M Coordinator to process the request for associating the terminal device with a sensor network and trigger an Edge Router to process the request for associating the terminal device with an IP network. In this way, the signaling interworking process when the terminal device associates with the sensor network and IP network is simplified, which saves network resources and complies with the principle of lower power consumption.

To clarify the methods for associating a terminal device with a sensor network and an IP network, which are provided in embodiments of the present invention, the following two embodiments are used to describe the process of associating a terminal device with a network.

Figure 5:
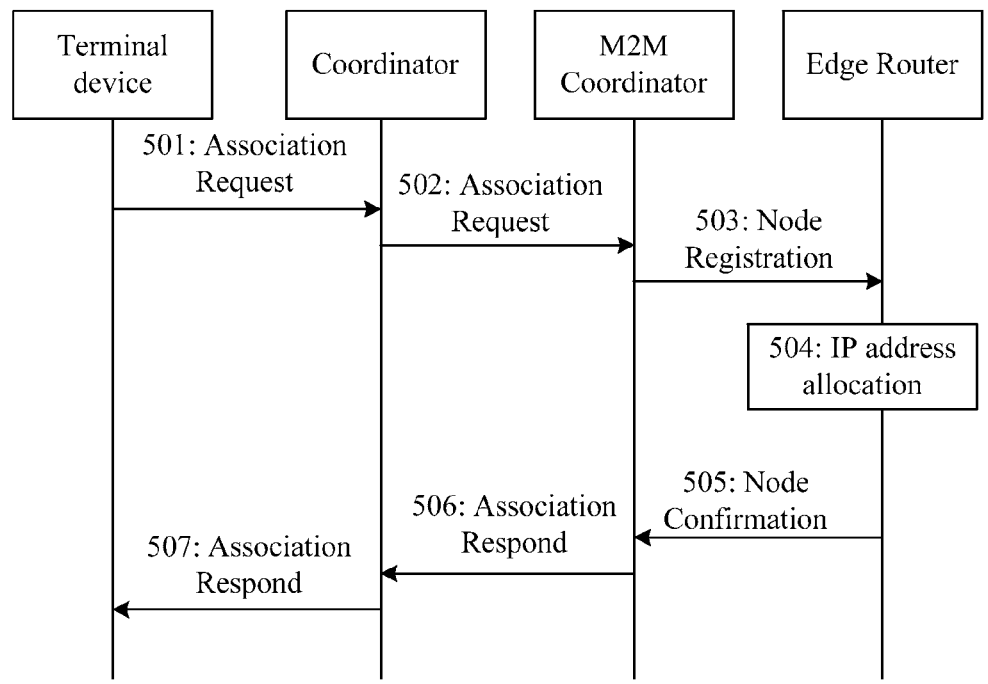
FIG. 5 is a flowchart of a method for associating a terminal device with a network provided in still another embodiment of the present invention.

FIG. 5 shows a method for associating a terminal device with a network provided in an embodiment of the present invention. According to the method, a terminal device is connected to an M2M Coordinator through a Coordinator. The M2M Coordinator and an Edge Router are located on different physical entities. The method includes:

501: The terminal device sends an Association Request message, where the Association Request message includes request information for associating the terminal device with a sensor network and an IP identifier, where the IP identifier indicates whether the terminal device requests association with the IP network.

Figure 6:
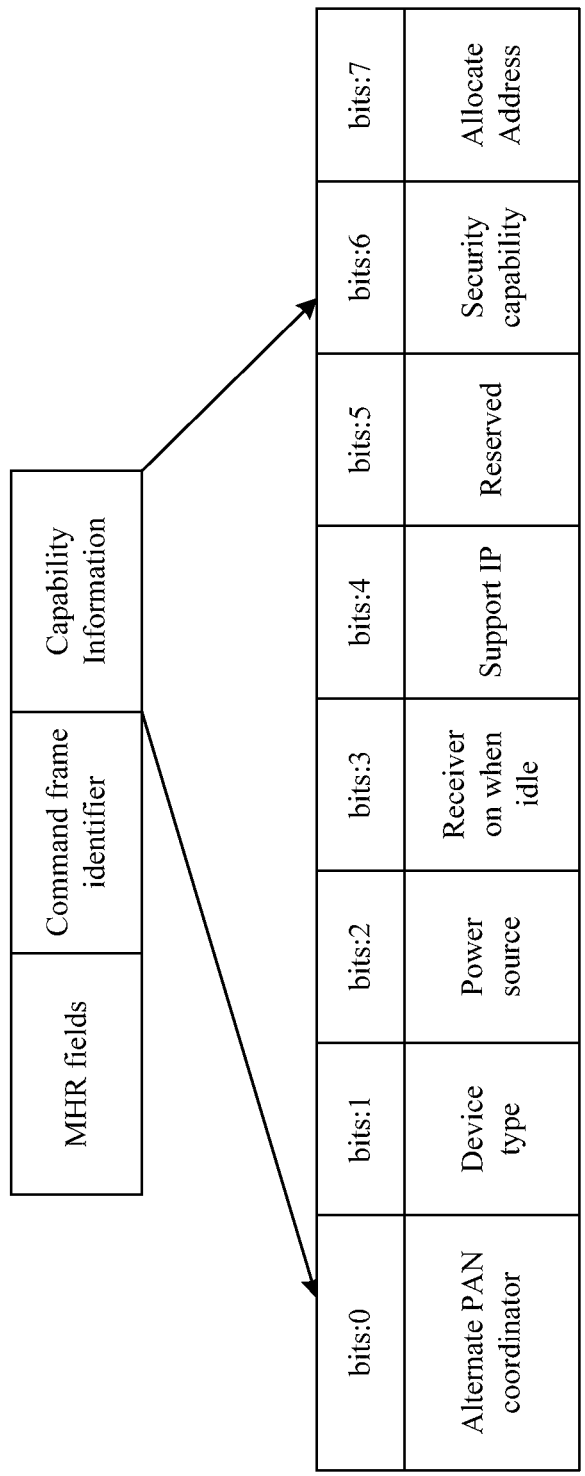
FIG. 6 is a structural diagram of an Association Request message provided in an embodiment of the present invention.

FIG. 6 shows the format of the Association Request message. The Association Request message includes: medium access control Header (MHR) fields, a Command frame identifier (Command frame identifier), and Capability information (Capability information), where, the MHR fields include a sensor network ID; the Capability information (Capability information) includes an Alternate PAN coordinator that is used to indicate whether the terminal device can function as a PAN Coordinator, Device Type that is used to identify the device type, Power source that is used to identify power resources, Receiver on when idle that is used to indicate whether data is transmitted in the idle state, Support IP that is used to indicate whether the terminal device requests association with an IP network, and Security capability that is used to identify security performance. When Allocate Address is set to 1, it indicates that a common short address is allocated to the terminal device when the Coordinator or M2M Coordinator processes the request for associating the terminal device with the sensor network; or, when Allocate Address is set to 0, it indicates that a special short address is allocated to the terminal device when the Coordinator or M2M Coordinator processes the request for associating the terminal device with the sensor network, where Allocate Address is a type of information of an Association Request for associating a terminal device with a sensor network.

502: The Coordinator receives the Association Request message and determines, according to the IP identifier, whether the terminal device requests association with an IP network. If the terminal device requests association with an IP network, the Coordinator forwards the Association Request message to the M2M Coordinator and proceeds with step 503; if the terminal device does not request association with an IP network, the Coordinator does not forward the Association Request message but processes the request for associating the terminal device with the sensor network. The Coordinator returns the processing result to the terminal device. The handling process is completed.

For details about how the Coordinator processes the request for associating the terminal device with the sensor network, reference may be made to the description in step 507.

503: The M2M Coordinator receives the Association Request message and determines, according to the IP identifier, whether the terminal device requests association with an IP network. If the terminal device requests association with an IP network, the M2M Coordinator sends an IP network Association Request message of the terminal device to an Edge Router. The IP network Association Request message may be a Node Registration message. The IP network Association Request message includes: sensor network information option. The sensor network information option may be the identification information of the sensor network.

In embodiments of the present invention, assume that the M2M Coordinator and the Edge Router are located on different physical entities. An IP network Association Request message is sent to the Edge Router through an IP network. At this time, a source IP address of the IP network Association Request message is the IP address of the M2M Coordinator and a destination IP address is the IP address of the Edge Router. If the M2M Coordinator and Edge Router are located on the same physical entity, no source IP address and destination IP address are needed.

504: The Edge Router authenticates the terminal device. After successfully authenticating the terminal device, the Edge Router allocates an IP address for the terminal device according to the sensor network information option.

Or, the Edge Router allocates an IP address for the terminal device. The above two ways do not affect the implementation of the present invention.

505: The Edge Router sends a response message in response to the IP network Association Request message to the M2M Coordinator. The response message may be a Node Confirmation message. The response message includes the result of processing, by the Edge Router, the request for associating the terminal device with the IP network.

The result of processing, by the Edge Router, the request for associating the terminal device with the IP network includes: an IP address allocated by the Edge Router for the terminal device. The processing result may further include: a result of authenticating the terminal device by the Edge Router. The authentication result information indicates that the authentication on the terminal device for accessing the IP network is successful. The processing result may not carry the authentication result information, which does not affect the implementation of the prevent invention.

506: The M2M Coordinator sends an Association Respond message to the Coordinator. The Association Respond message includes the result of processing, by the Edge Router, the request for associating the terminal with the IP network.

If the network rule specifies that the M2M Coordinator processes the request for associating the terminal device with the sensor network, this step further includes the result of processing, by the M2M Coordinator, the request for associating the terminal device with the sensor network. If the network rule specifies that the terminal device is connected to the M2M Coordinator through a Coordinator and the Coordinator processes the request for associating the terminal device with the sensor network, the M2M Coordinator does not process the request for associating the terminal device with the sensor network in this step. Embodiments of the present invention assume that the network rule specifies that the Coordinator processes the request for associating the terminal device with the sensor network.

507: The Coordinator processes, according to the Association Request message of the terminal device, the request for associating the terminal device with the sensor network and adds the processing result to the Association Respond message and sends the Association Respond message to the terminal device.

This step is not limited to be implemented after step 502, but may be also implemented before receiving the Association Request message in step 502. The implementation sequence does not affect the implementation of the present invention.

The processing the request for associating the terminal device with the sensor network includes: authenticating the terminal device. If the Allocate Address in the Association Request message of the terminal device is 1, the Coordinator in this step allocates a common short address to the terminal device for accessing the sensor network. At this time, the processing result includes the common short address allocated by the Coordinator for the terminal device for accessing the sensor network. If the Allocate Address in the Association Request message of the terminal device is 0, the Coordinator in this step allocates a special short address for the terminal device for accessing the sensor network. At this time, the processing result includes the special short address allocated by the Coordinator for the terminal device for accessing the sensor network.

Figure 7:
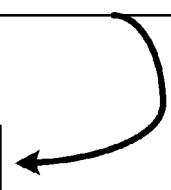
FIG. 7 is a structural diagram of an Association Respond message provided in an embodiment of the present invention.

The format of the response message is shown in FIG. 7. The response message includes MHR fields, a Command frame identifier, a Short Address, and Association Status. Association Status may be 0x00 and 0x01-0xff, where 0x00 indicates that the association with the IP network and sensor network is successful; 0x01 indicates that the PAN is fully-loaded; 0x02 indicates that the PAN rejects access; 0x03 indicates that the IP network rejects access; 0x04-0xff are reserved. The Short Address is used to access the sensor network. The IP address allocated by the Edge Router for the terminal device may locate behind Association Status in the response message.

An Association Request message sent by a terminal device in embodiments of the present invention includes a request for associating the terminal device with a sensor network and an IP identifier. The IP identifier indicates whether the terminal device requests for associating with an IP network. An M2M Coordinator or a Coordinator processes, according to the Association Request message, the request of the terminal device for associating with the sensor network; when the terminal device requests association with an IP network, the M2M Coordinator or the Coordinator triggers an Edge Router to process the IP network Association Request of the terminal device; the M2M Coordinator or the Coordinator sends to the terminal device the result of processing the Association Request for associating the terminal device with the sensor network and the result of processing, by the Edge Router, the request for associating the terminal device with the IP network. In this way, the signaling interworking process when the terminal device associates with the sensor network and IP network is simplified, which saves network resources and complies with the principle of lower power consumption.

Figure 8:
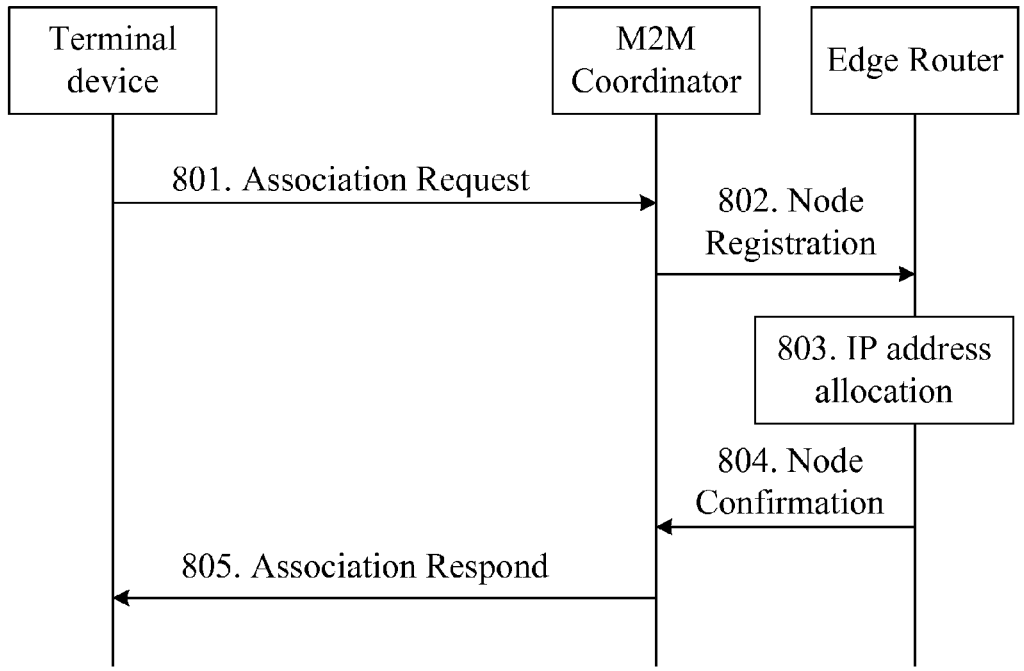
FIG. 8 is a flowchart of a method for associating a terminal device with a network provided in a first embodiment of the present invention.

As shown in FIG. 8, an embodiment of the present invention provides a method for associating a terminal device with a network. According to the method, the terminal device is directly connected to an M2M Coordinator, including:

801: The terminal device sends an Association Request message, where the Association Request message includes request information for associating the terminal device with a sensor network and an IP identifier, where the IP identifier indicates whether the terminal device requests association with the IP network. FIG. 6 shows the detailed format of the Association Request message.

802: The M2M Coordinator receives the Association Request message and determines, according to the IP identifier, whether the terminal device requests association with an IP network. If the terminal device requests association with an IP network, the M2M Coordinator sends an IP network Association Request message of the terminal device to an Edge Router. The IP network Association Request message may be a Node Registration message. The IP network Association Request message may include: sensor network information option. The sensor network information option may be the identification information of the sensor network.

In embodiments of the present invention, assume that the M2M Coordinator and the Edge Router are located on different physical entities. An IP network Association Request message is sent to the Edge Router through an IP network. At this time, a source IP address of the IP network Association Request message is the IP address of the M2M Coordinator and a destination IP address is the IP address of the Edge Router. If the M2M Coordinator and Edge Router are located on the same physical entity, no source IP address and destination IP address are needed.

803: The Edge Router authenticates the terminal device. After successfully authenticating the terminal device, the Edge Router allocates an IP address for the terminal device according to the sensor network information option.

Or, the Edge Router directly allocates an IP address for the terminal device. The above two ways does not affect the implementation of the present invention.

804: The Edge Router sends a response message in response to the IP network Association Request message to the M2M Coordinator. The response message may be a Node Confirmation message. The response message includes the result of processing, by the Edge Router, the request for associating the terminal device with the IP network. The processing result includes the IP address allocated by the Edge Router for the terminal device.

805: The M2M Coordinator processes the request for associating the terminal device with the sensor network and sends an Association Respond message to the terminal device. The Association Respond message includes the result of processing, by the Edge Router, the request for associating the terminal device with the IP network and the result of processing, by the M2M Coordinator, the request for associating the terminal device with the sensor network.

This step is not limited to be implemented after step 804, but may also be implemented before the M2M Coordinator receives the Association Request message in step 802. The implementation sequence does not affect the implementation of the present invention.

An Association Request message sent by a terminal device in embodiments of the present invention includes a request for associating the terminal device with a sensor network and an IP identifier. The IP identifier indicates whether the terminal device requests association with an IP network. An M2M Coordinator processes, according to the Association Request message, the request for associating the terminal device with the sensor network; when the terminal device requests association with an IP network, the M2M Coordinator triggers an Edge Router to process the IP network Association Request of the terminal device; the M2M Coordinator sends to the terminal device the result of processing the Association Request for associating the terminal device with the sensor network and the result of processing the request for associating the terminal device with the IP network. In this way, the signaling interworking process when the terminal device associates with the sensor network and IP network is simplified, which saves network resources and complies with the principle of lower power consumption.

Figure 9:
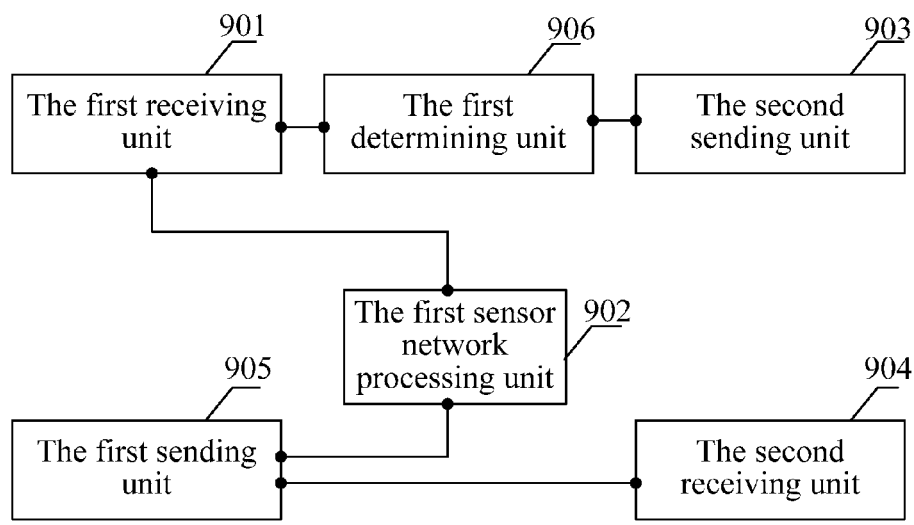
FIG. 9 is a structural diagram of an M2M Coordinator provided in an embodiment of the present invention.

As shown in FIG. 9, an embodiment of the present invention provides an M2M Coordinator which includes:

the first receiving unit 901, configured to receive an Association Request message sent by a terminal device, where the Association Request message includes information of a request for associating the terminal device with a sensor network and an IP identifier, where the IP identifier indicates whether the terminal device requests association with an IP network;

the first sensor network processing unit 902, configured to process, according to the Association Request message, the request for associating a terminal device with a sensor network;

the first determining unit 906, configured to determine, according to the IP identifier, whether the terminal device requests association with an IP network;

the second sending unit 903, configured to, when the terminal device requests association with an IP network, send an IP network Association Request message to an Edge Router, where the IP network Association Request message is used to indicate that the terminal device requests association with the IP network;

the second receiving unit 904, configured to receive a result of processing, by an Edge Router, the request for associating the terminal device with the IP network; the first sending unit 905, configured to send an Association Respond message to the terminal device, where the Association Respond message includes the result of processing an Association Request for associating the terminal device with the sensor network and the result of processing, by the Edge Router, an Association Request for associating the terminal device with the IP network.

If a terminal device is connected to the M2M Coordinator through a Coordinator, an Association Request message is forwarded by the Coordinator to the M2M Coordinator after the Coordinator determines, according to an IP identifier, that the terminal device requests association with an IP network; if the terminal device is directly connected to the M2M Coordinator, an Association Request message is directly sent by the terminal device to the M2M Coordinator.

An Association Request message sent by a terminal device in embodiments of the present invention includes a request for associating the terminal device to a sensor network and an IP identifier. The IP identifier indicates whether the terminal device requests association with an IP network. An M2M Coordinator processes, according to the Association Request message, the request for associating the terminal device with the sensor network; when the terminal device requests association with an IP network, the M2M Coordinator sends an IP network Association Request message to an Edge Router to trigger the Edge Router to process the IP network Association Request of the terminal device; the M2M Coordinator sends to the terminal device the result of processing the Association Request for associating the terminal device with the sensor network and the result of processing the request for associating the terminal device with the IP network. In this way, the signaling interworking process when the terminal device associates with the sensor network and IP network is simplified, which saves network resources and complies with the principle of lower power consumption.

Figure 10:
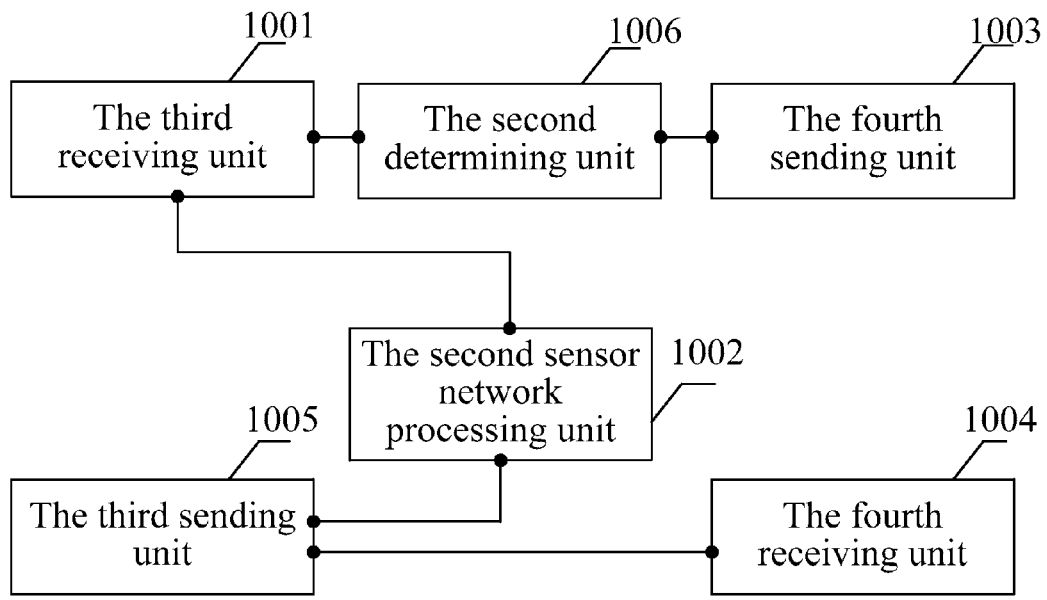
FIG. 10 is a structural diagram of a Coordinator provided in an embodiment of the present invention.

As shown in FIG. 10, an embodiment of the present invention provides a Coordinator which includes:

the third receiving unit 1001, configured to receive an Association Request message sent by a terminal device, where the Association Request message includes information of a request for associating the terminal device with a sensor network and an IP identifier, where the IP identifier indicates whether the terminal device requests association with an IP network;

the second sensor network processing unit 1002, configured to process, according to the Association Request message, the request for associating a terminal device with a sensor network;

the second determining unit 1006, configured to determine, according to the IP identifier, whether the terminal device requests association with an IP network;

the fourth sending unit 1003, configured to, when the terminal device requests association with an IP network, forward an Association Request message to an M2M Coordinator to trigger the M2M Coordinator to send an IP network Association Request message to an Edge Router, where the IP network Association Request message is used to indicate that terminal device requests association with the IP network;

the fourth receiving unit 1004, configured to receive a result of processing, by the Edge Router, the request for associating the terminal device with the IP network forwarded by the M2M;

the third sending unit 1005, configured to send an Association Respond message to the terminal device, where the Association Respond message includes the result of processing the Request for associating the terminal device with the sensor network and the result of processing, by the Edge Router, the Request for associating the terminal device with the IP network.

An Association Request message sent by a terminal device in embodiments of the present invention includes a request for associating the terminal device to a sensor network and an IP identifier. The IP identifier indicates whether the terminal device requests association with an IP network. A Coordinator processes, according to the Association Request message, the request for associating the terminal device with the sensor network; when the terminal device requests association with an IP network, the Coordinator forwards an Association Request message to an M2M Coordinator to trigger the M2M Coordinator to send an IP network Association Request message to an Edge Router; the Coordinator sends the result of processing, by the Coordinator, the Request for associating the terminal device with the sensor network and the result of processing, the Edge Router, the Request for associating the terminal device with the IP network forwarded by the M2M Coordinator. In this way, the signaling interworking process when the terminal device associates with the sensor network and IP network is simplified, which saves network resources and complies with the principle of lower power consumption.

Figure 11:
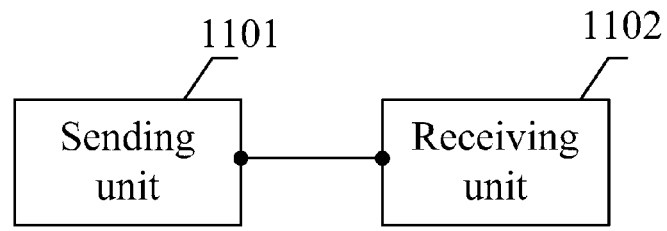
FIG. 11 is a structural diagram of a terminal device provided in an embodiment of the present invention.

As shown in FIG. 11, an embodiment of the present invention provides a terminal device which includes:

sending unit 1101, configured to send an Association Request message, where the Association Request message includes information of a request for associating the terminal device with a sensor network and an IP identifier, where the IP identifier indicates whether the terminal device requests association with the IP network;

receiving unit 1102, configured to receive an Association Respond message, where the Association Respond message includes: the result of processing the Association Request for associating the terminal device with the sensor network; when the IP identifier indicates that the terminal device requests association with an IP network, the Association Respond message further includes the result of processing the Association Request for associating the terminal device with the IP network.

In embodiments of the present invention, an Association Request message directly sent by a terminal device includes request information for associating the terminal device with a sensor network and an IP identifier. The IP identifier indicates whether the terminal device requests association with the IP network. The Association Request message can trigger a Coordinator or an M2M Coordinator to process the request for associating the terminal device with a sensor network and trigger an Edge Router to process the request for associating the terminal device with an IP network. In this way, the signaling interworking process when the terminal device associates with the sensor network and IP network is simplified, which saves network resources and complies with the principle of lower power consumption.

Figure 12:
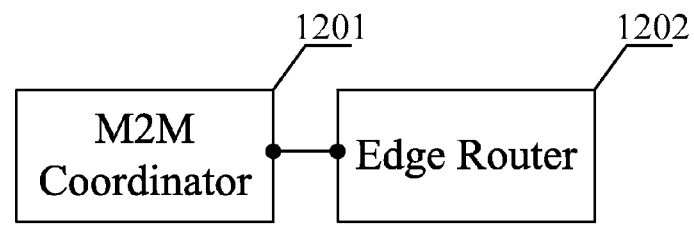
FIG. 12 is a system diagram of a network system provided in an embodiment of the present invention.

As shown in FIG. 12, an embodiment of the present invention provides a network system, including M2M Coordinator 1201 and Edge Router 1202, where, M2M Coordinator 1201, configured to receive an Association Request message sent by a terminal device, where the Association Request message includes information of a request for associating the terminal device with a sensor network and an IP identifier, where the IP identifier indicates whether the terminal device requests association with the IP network; process, according to the Association Request message, the request for associating the terminal device with the sensor network; when it is determined, according to the IP identifier, that the terminal device requests association with an IP network, send an IP network Association Request message to an Edge Router, where the IP network Association Request message is used to indicate that the terminal device requests association with the IP network; receive a result of processing, by the Edge Router, the request for associating the terminal device with the IP network; send an Association Respond message to the terminal device, where the Association Respond message includes the result of processing the request for associating the terminal device with the sensor network and the result of processing, by the Edge Router, the request for associating the terminal device with the IP network;

Edge Router 1202, configured to receive an IP network Association Request message and send the result of processing the request for associating the terminal device with the IP network to an M2M Coordinator.

The network system further includes: a Coordinator, configured to receive an Association Request message sent by a terminal device and forward the Association Request message to M2M Coordinator 1201 after determining, according to the IP identifier, that the terminal device requests association with an IP network.

An Association Request message sent by a terminal device in embodiments of the present invention includes a request for associating the terminal device with a sensor network and an IP identifier. The IP identifier indicates whether the terminal device requests association with an IP network. An M2M Coordinator processes, according to the Association Request message, the request for associating the terminal device with the sensor network; when the terminal device requests association with an IP network, the M2M Coordinator sends an IP network Association Request message to an Edge Router to trigger the Edge Router to process the IP network Association Request from the terminal device; the M2M Coordinator sends to the terminal device the result of processing the Association Request for associating the terminal device with the sensor network and the result of processing the request for associating the terminal device with the IP network. In this way, the signaling interworking process when the terminal device associates with the sensor network and IP network is simplified, which saves network resources and complies with the principle of lower power consumption.

Figure 13:
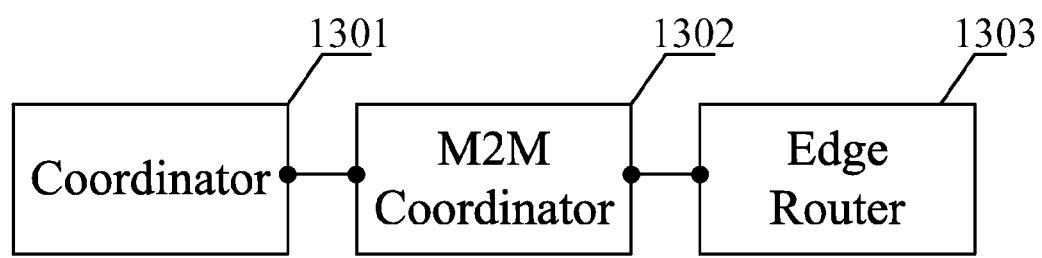
FIG. 13 is a system diagram of another network system provided in an embodiment of the present invention.

As shown in FIG. 13, an embodiment of the present invention provides a network system, including Coordinator 1301, M2M Coordinator 1302, and Edge Router 1303, where, Coordinator 1301 is configured to receive an Association Request message sent by a terminal device, where the Association Request message includes information of a request for associating the terminal device with a sensor network and an IP identifier, where the IP identifier indicates whether the terminal device requests association with an IP network; process, according to the Association Request message the request for associating the terminal device with the sensor network; when it is determined, according to the IP identifier, that the terminal device requests association with an IP network, forward an Association Request message to an M2M Coordinator to trigger the M2M Coordinator to send an IP network Association Request message to an Edge Router, where the IP network Association Request message is used to indicate that the terminal device requests association with the IP network; receive a result of processing, by the Edge Router, the request for associating the terminal device with the IP network forwarded by the M2M; send an Association Respond message to the terminal device, where the Association Respond message includes the result of processing the Request for associating the terminal device with the sensor network and the result of processing, by the Edge Router, the Request for associating the terminal device with the IP network;

M2M Coordinator 1302 is configured to receive an Association Request message and send an IP network Association Request message to an Edge Router; send the result of processing, by Edge Router 1303, the request for associating the terminal device with the IP network to Coordinator 1301;

Edge Router 1303 is configured to receive an IP network Association Request message and send the result of processing the request for associating the terminal device with the IP network to an M2M Coordinator.

An Association Request message sent by a terminal device in embodiments of the present invention includes a request for associating the terminal device with a sensor network and an IP identifier. The IP identifier indicates whether the terminal device requests association with an IP network. A Coordinator processes, according to the Association Request message, the request for associating the terminal device with the sensor network; when the terminal device requests association with an IP network, the Coordinator forwards an Association Request message to an M2M Coordinator to trigger the M2M Coordinator to send an IP network Association Request message to an Edge Router; the Coordinator sends the result of processing, by the Coordinator, the request for associating the terminal device with the sensor network and the result of processing, by the Edge Router, the Association Request for associating the terminal device with the IP network forwarded by the M2M Coordinator. In this way, the signaling interworking process when the terminal device associates with the sensor network and IP network is simplified, which saves network resources and complies with the principle of lower power consumption.

Persons skilled in the art should understand that all or part of the steps of the method provided in the embodiments above may be implemented by a program instructing relevant hardware. The program may be stored in computer readable storage media, such as a read-only memory, magnetic disk, or compact disk.

The method, network element device, and network system for associating a terminal device with a network that are provided in the embodiments of the present invention are described in detail in the preceding. The preceding description of the embodiments is only used to help understand the method and idea of the present invention; meanwhile, those skilled in the art may make variations to the specific implementation manner and application scope according to the idea of the present invention. In conclusion, the content of this specification shall not be construed as a limitation to the present invention.

The invention claimed is:

1. A method for associating a terminal device with a network, comprising:
   receiving an association request message sent by the terminal device, wherein the association request message comprises information of a request for associating the terminal device with a sensor network and an IP identifier, wherein the IP identifier indicates whether the terminal device requests association with an IP network;
   processing, according to the association request message, the request for associating the terminal device with the sensor network;
   when it is determined, according to the IP identifier, that the terminal device requests association with the IP network, sending an IP network association request message to an edge router, wherein the IP network association request message is used to indicate that the terminal device requests association with the IP network;
   receiving a result of processing, by the edge router, the request for associating the terminal device with the IP network;
   sending an association respond message to the terminal device, wherein the association respond message comprises a result of processing the request for associating the terminal device with the sensor network and a result of processing, by the edge router, the request for associating the terminal device with the IP network.

2. The method according to claim 1, wherein:
   the receiving the association request message sent by the terminal device, comprises:
   receiving the association request message forwarded by a coordinator after the coordinator determines that the terminal device requests association with the IP network, or receiving the association request message directly sent by the terminal device.

3. A method for associating a terminal device with a network, comprising:
   receiving an association request message sent by the terminal device, wherein the association request message comprises information of a request for associating the terminal device with a sensor network and an IP identifier, wherein the IP identifier indicates whether the terminal device requests association with the IP network;
   processing, according to the association request message, the request for associating the terminal device with the sensor network;
   when it is determined, according to an IP identifier, that the terminal device requests association with the IP network, forwarding the association request message to a machine to machine (M2M) coordinator to trigger the M2M coordinator to send an IP network association request message to an edge router, wherein the IP network association request message is used to indicate that the terminal device requests association with the IP network;
   receiving a result of processing, by the edge router, the request for associating the terminal device with the IP network forwarded by the M2M coordinator;
   sending an association respond message to the terminal device, wherein the association respond message comprises the result of processing the request for associating the terminal device with the sensor network and a result of processing, by the edge router, the request for associating the terminal device with the IP network.

4. A method for associating a terminal device with a network, comprising:
   sending an association request message, by the terminal device, wherein the association request message comprises information of a request for associating the terminal device with a sensor network and an IP identifier, wherein the IP identifier indicates whether the terminal device requests association with the IP network;
   receiving an association respond message, by the terminal device, wherein the association respond message comprises: a result of processing the request for associating the terminal device with the sensor network; when the IP identifier indicates that the terminal device requests association with the IP network, the association respond message further comprises a result of processing the request for associating the terminal device with the IP network;

wherein the result of processing the request for associating the terminal device with the sensor network refers to a result of processing, by a machine to machine (M2M) coordinator, the request for associating the terminal device with the sensor network;

the result of processing the request for associating the terminal device to the IP network refers to a result of processing, by the edge router, the request for associating the terminal device to the IP network.

5. A machine to machine (M2M) Coordinator, comprising:
a first receiving unit, configured to receive an association request message sent by a terminal device, wherein the association request message comprises information of a request for associating the terminal device with a sensor network and an IP identifier, wherein the IP identifier indicates whether the terminal device requests association with an IP network;
a sensor network processing unit, configured to process, according to the association request message, the request for associating the terminal device with the sensor network;
a determining unit, configured to determine, according to the IP identifier, whether the terminal device requests association with the IP network;
a second sending unit, configured to, when the terminal device requests association with the IP network, send an IP network association request message to an edge router, wherein the IP network association request message is used to indicate that the terminal device requests association with the IP network;
a second receiving unit, configured to receive a result of processing, by the edge router, the request for associating the terminal device with the IP network;
a first sending unit, configured to send an association respond message to the terminal device, wherein the association respond message comprises a result of processing the request for associating the terminal device to the sensor network and a result of processing, by the edge router, the request for associating the terminal device to the IP network.

6. A coordinator, comprising:
a first receiving unit, configured to receive an association request message sent by a terminal device, wherein the association request message comprises information of a request for associating the terminal device with a sensor network and an IP identifier, wherein the IP identifier indicates whether the terminal device requests association with an IP network;
a sensor network processing unit, configured to process, based on an association request message, the request for associating the terminal device with the sensor network;
a determining unit, configured to determine, based on the IP identifier, whether the terminal device requests association with the IP network;
a first sending unit, configured to, when the terminal device requests association with an IP network, forward the association request message to a machine to machine (M2M) coordinator to trigger the M2M coordinator to send an IP network association request message to an edge router, wherein the IP network association request message is used to indicate that the terminal device requests association with the IP network;
a second receiving unit, configured to receive a result of processing, by the edge router, the request for associating the terminal device with the IP network forwarded by the M2M coordinator;
a second sending unit, configured to send an association respond message to the terminal device, wherein the association respond message comprises a result of processing the request for associating the terminal device with the sensor network and a result of processing, by the edge router, the request for associating the terminal device with the IP network.

7. A terminal device, comprising:
a sending unit, configured to send an association request message, wherein the association request message comprises information of a request for associating the terminal device with a sensor network and an IP identifier, wherein the IP identifier indicates whether the terminal device requests association with the IP network;
a receiving unit, configured to receive an association respond message, wherein the association respond message comprises: a result of processing the request for associating the terminal device with the sensor network; when the IP identifier indicates that the terminal device requests association with the IP network, the association respond message further comprises a result of processing the request for associating the terminal device with the IP network;
wherein the result of processing the request for associating the terminal device with the sensor network refers to a result of processing, by a machine to machine (M2M) coordinator, the request for associating the terminal device with the sensor network;
the result of processing the request for associating the terminal device to the IP network refers to a result of processing, by the edge router, the request for associating the terminal device to the IP network.

8. A network system, comprising a machine to machine (M2M) coordinator and an edge router, wherein,
the M2M coordinator is configured to receive an association request message sent by a terminal device, wherein the association request message comprises information of a request for associating the terminal device with a sensor network and an IP identifier, wherein the IP identifier indicates whether the terminal device requests association with the IP network; process, according to the association request message, the request for associating the terminal device with the sensor network; when it is determined, according to an IP identifier, that the terminal device requests association with the IP network, send an IP network association request message to an edge router, wherein the IP network association request message is used to indicate that the terminal device requests association with the IP network; receive a result of processing, by the edge router, the request for associating the terminal device with the IP network; send an association respond message to the terminal device, wherein the association respond message comprises a result of processing the request for associating the terminal device with the sensor network and a result of processing, by the edge router, the request for associating the terminal device with the IP network;
the edge router is configured to receive the IP network association request message and send the result of processing, by the edge router, the request for associating the terminal device with the IP network to the M2M coordinator.

9. The method according to claim 8, wherein:

the network system further comprises:

a coordinator, configured to receive the association request message sent by the terminal device, and forward the association request message to the M2M coordinator after it is determined, according to the IP identifier, that the terminal device requests association with the IP network.

10. A network system, comprising a coordinator, a machine to machine (M2M) coordinator, and an edge router, wherein, the coordinator is configured to receive an association request message sent by a terminal device, wherein the association request message comprises information of a request for associating the terminal device with a sensor network and an IP identifier, wherein the IP identifier indicates whether the terminal device requests association with an IP network; process, according to the association request message, the request for associating the terminal device with the sensor network; when it is determined, according to the IP identifier, that the terminal device requests association with the IP network, forward the association request message to a machine to machine (M2M) coordinator to trigger the M2M coordinator to send an IP network association request message to an edge router, wherein the IP network association request message is used to indicate that the terminal device requests association with the IP network; receive a result of processing, by the edge router, the request for associating the terminal device with the IP network forwarded by the M2M coordinator; send an association respond message to the terminal device, wherein the association respond message comprises a result of processing the request for associating the terminal device with the sensor network and a result of processing, by the edge router, the request for associating the terminal device with the IP network;

the M2M Coordinator is configured to receive an association request message and send the IP network association request message to an edge router; send a result of processing, by the edge router, the request for associating the terminal device with the IP network to the coordinator;

the edge router is configured to receive the IP network association request message and send a result of processing, by the edge router, the request for associating the terminal device with the IP network to the M2M coordinator.

\* \* \* \* \*

UNITED STATES PATENT AND TRADEMARK OFFICE
CERTIFICATE OF CORRECTION

| | | |
|---|---|---|
| PATENT NO. | : 8,774,053 B2 | Page 1 of 1 |
| APPLICATION NO. | : 13/629200 | |
| DATED | : July 8, 2014 | |
| INVENTOR(S) | : Pan et al. | |

It is certified that error appears in the above-identified patent and that said Letters Patent is hereby corrected as shown below:

Title Page, item [71] Applicant, "Guangdong (CN)" should read -- Shenzhen (CN) --.

Signed and Sealed this
Twenty-fifth Day of November, 2014

Michelle K. Lee
*Deputy Director of the United States Patent and Trademark Office*